(12) United States Patent
Liu et al.

(10) Patent No.: US 8,381,027 B1
(45) Date of Patent: Feb. 19, 2013

(54) DETERMINING ALTERNATE PATHS IN FAULTED SYSTEMS

(75) Inventors: Qing Liu, North Grafton, MA (US); Qi Zhang, Northborough, MA (US); Peter Tolvanen, Foxborough, MA (US); T. David Evans, Rutland, MA (US); Hongliang Tang, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 12/892,333

(22) Filed: Sep. 28, 2010

(51) Int. Cl.
*G06F 11/00* (2006.01)
(52) U.S. Cl. .............. 714/13; 714/6.1; 714/42; 714/43
(58) Field of Classification Search .......... 714/5.1, 714/5.11, 6.1, 6.2, 6.21, 6.22, 6.3, 13, 42, 714/43
See application file for complete search history.

(56) References Cited

U.S. PATENT DOCUMENTS

| | | | | |
|---|---|---|---|---|
| 5,975,738 | A * | 11/1999 | DeKoning et al. | 714/42 |
| 6,578,158 | B1 * | 6/2003 | Deitz et al. | 714/5.11 |
| 6,874,100 | B2 * | 3/2005 | Rauscher | 714/6.21 |
| 7,318,138 | B1 * | 1/2008 | Usgaonkar et al. | 711/163 |
| 2002/0133735 | A1 * | 9/2002 | McKean et al. | 714/5 |
| 2003/0140191 | A1 * | 7/2003 | McGowen et al. | 710/302 |
| 2005/0147932 | A1 * | 7/2005 | Johnston et al. | 430/467 |
| 2009/0265584 | A1 * | 10/2009 | Kawakami et al. | 714/43 |

* cited by examiner

*Primary Examiner* — Joseph D Manoskey
(74) *Attorney, Agent, or Firm* — Krishnendu Gupta; Jason A. Reyes; Deepika Bhayana (57) ABSTRACT

A method is used in determining alternate paths in faulted systems. It is detected that a first processor has a problem accessing a target. The first processor has a first path to the target. An alternate path to the target is determined by identifying that a second processor has better access to the target than the first processor. The second processor has a second path to the target. Responsibility for I/O communication with the target is transferred from the first processor to the second processor. Responsibility for I/O communication with the target is transferred back to the first processor upon resolution of the problem.

18 Claims, 10 Drawing Sheets

DETERMINING ALTERNATE PATHS IN FAULTED SYSTEMS

BACKGROUND

1. Technical Field

This application relates to determining alternate paths in faulted systems.

2. Description of Related Art

Computers, computer networks, and other computer-based systems are becoming increasingly important as part of the infrastructure of everyday life. Networks are used for sharing peripherals and files. In such systems, complex components are the most common sources of failure or instability. The proliferation of multiple interacting components leads to problems that are difficult or impossible to predict or prevent. The problems are compounded by the use of networks, which introduce the added complexity of multiple machines interacting in obscure and unforeseen ways.

Additionally, the need for high performance, high capacity information technology systems is driven by several factors. In many industries, critical information technology applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss and minimum data unavailability. Computing systems of all types are not only accommodating more data but are also becoming more and more interconnected, raising the amounts of data exchanged at a geometric rate.

To address this demand, modern data storage systems ("storage systems") are put to a variety of commercial uses. For example, they are coupled with host systems to store data for purposes of product development, and large storage systems are used by financial institutions to store critical data in large databases. For many uses to which such storage systems are put, it is highly important that they be highly reliable so that critical data is not lost or unavailable.

A typical data storage system stores and retrieves data for one or more external host devices. Such a data storage system typically includes processing circuitry and a set of disk drives (disk drives are also referred to herein as simply "disks" or "drives"). In general, the processing circuitry performs load and store operations on the set of disk drives on behalf of the host devices.

In certain data storage systems, the disk drives of the data storage system are distributed among one or more separate disk drive enclosures and processing circuitry serves as a front-end to the disk drive enclosures. The processing circuitry presents the disk drive enclosures to the host device as a single, logical storage location and allows the host device to access the disk drives such that the individual disk drives and disk drive enclosures are transparent to the host device.

In the aforementioned data storage system, the processing circuitry and the disk drive enclosures are typically interconnected in a serial manner using a number of cables to provide the front end processing circuitry with access to any of the individual disk drives of the disk drive enclosures. For example, in the case where the data storage system includes multiple disk drive enclosures, a first cable electrically couples the processing circuitry to a first enclosure, a second cable electrically couples the first enclosure to a second enclosure, a third cable electrically couples the second enclosure to a third enclosure, and so on until each of the disk drive enclosures in the data storage system are serially coupled to the processing circuitry.

For example, Fibre Channel is a high performance, serial interconnect standard for bi-directional, point-to-point communications between servers, storage systems, workstations, switches, and hubs. Fibre Channel standards are described by the Fibre Channel Industry Association (FCIA) (http://www.fibrechannel.org). Fibre Channel employs a topology known as a "fabric" to establish connections between nodes. A fabric is a network of switches for interconnecting a plurality of devices without restriction as to the manner in which the switch can be arranged. A fabric can include a mixture of point-to-point and arbitrated loop topologies.

Because of the high bandwidth and flexible connectivity provided by FC, FC is a common medium for interconnecting devices within multi-peripheral-device enclosures, such as redundant arrays of inexpensive disks ("RAIDs"), and for connecting multi-peripheral-device enclosures with one or more host computers. These multi-peripheral-device enclosures economically provide greatly increased storage capacities and built-in redundancy that facilitates mirroring and fail over strategies needed in high-availability systems. Although FC is well-suited for this application with regard to capacity and connectivity, FC is a serial communications medium. Malfunctioning peripheral devices and enclosures can, in certain cases, degrade or disable communications. FC-based multi-peripheral-device enclosures are expected to isolate and recover from malfunctioning peripheral devices.

In particular, an FC interface which connects devices in a loop such as a Fibre Channel Arbitrated Loop (FC-AL) is widely used in disk array apparatuses and the like, since it has a simple connecting configuration of cables and can easily accommodate device extensions. In this type of interface, when signals cannot propagate in the loop because of failures or the like in interface circuits of connected devices (this is called, for example, loop abnormality or link down), the whole loop cannot be used. That is, even though a failure occurs in only one device, all devices connected to the loop cannot be used. Thus, disk array apparatuses usually have interface circuits for two ports, so that these devices are connected to two independent loops. With this configuration, even when one loop of the dual loop interfaces is out of use because of a failure or the like, accesses can be performed using the other loop, to thereby improve reliability.

In a data storage system, if a component is bad and is causing loop disturbance in such a way that the loop is "bouncing" causing software to re-initialize the loop repeatedly, it can cause input/output data transactions (I/Os) to be queued up and can cause multiple drives to be removed, input/output performance to be degraded, and can ultimately lead to a data unavailable/data loss (DU/DL) situation. Whenever the loop is unstable, conventionally, software removes drives that are reporting errors but the bad component may not be a drive. Since conventionally the bad component is not actually being removed, more instability results and ultimately I/Os get backed up, and the situation can lead to DU/DL. Also, conventionally, since I/Os can get backed up before they are resumed, the situation can lead to performance degradation and storage processor (SP) crashes. Furthermore, conventionally, identification of the bad component can be difficult for the user and multiple parts may end up being replaced.

SUMMARY OF THE INVENTION

A method is used in determining alternate paths in faulted systems. It is detected that a first processor has a problem accessing a target. The first processor has a first path to the target. An alternate path to the target is determined by identifying that a second processor has better access to the target than the first processor. The second processor has a second path to the target. Responsibility for I/O communication with the target is transferred from the first processor to the second processor. Responsibility for I/O communication with the target is transferred back to the first processor upon resolution of the problem.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Described below is a technique for use in determining alternate paths in faulted systems. In accordance with the technique, a method may be provided for detecting an alternate path, particularly a better path, in a storage system in order to continue servicing user IOs in case of a problem accessing one or more disk drives in a RAID group.

Conventionally, in a data storage system, when a storage processor loses access to one or more disk drives due to a problem, the storage processor marks the disk drives that it cannot access as bad and removes them. Thus, conventionally in such a case, once the disk drives are removed by the storage processor, other storage processors in the data storage system remove the same disk drives as well from their path of access even though one or more of the other storage processors may be able to access the disk drives successfully. Later, when the problem is fixed and access to the disk drives is restored, the storage processor in such conventional system needs to rebuild the disks drives that may have been removed unnecessarily at the first place. In a RAID group, when a physical disk drive fails ("failed drive"), a host attached to the data storage system keeps writing data to the physical disk drive. When the failed drive is replaced, either automatically (e.g., by a hot spare, which is an idle disk drive that can be integrated into the RAID group electronically) or manually (by removing the failed drive and inserting a new drive), a disk rebuild is needed wherein the failed drive's data is rebuilt onto the replacement drive based on data storage redundancy within the RAID group. The disk rebuild can take a very long time, especially in the case of a disk drive containing a large amount of data. During the disk rebuild, all the disk drives within the RAID group are hit with heavy IOs. Heavy IOs cause significant IO performance degradation for hosts that are attached to a data storage system. As a result, in a conventional system, it may also cause data unavailability for host applications that cannot tolerate long response times.

By contrast, in at least some implementations in accordance with the technique as described herein, removing a set of disk drives only when there is no alternate path (or no suitable alternate path) available allows the data storage system to be more efficient and can help avoid unnecessary rebuilds of disk drives. In at least one storage system implementation as described below, determining the alternate path to a set of disk drives to continue servicing user IOs provides uninterrupted access to data and improves system's performance dramatically.

In at least some implementations in accordance with the technique as described herein, use of determining alternate paths in a faulted system can provide one or more of the following advantages: improving data storage system performance by avoiding rebuilding a set of disk drives when access to those disk drives is restored, increasing system availability by determining an alternate path to a set of disk drives when a storage processor loses access to the set of disk drives and eliminating degraded IO performance during read or write operations when a problem occurs on a single storage processor.

Figure 1:
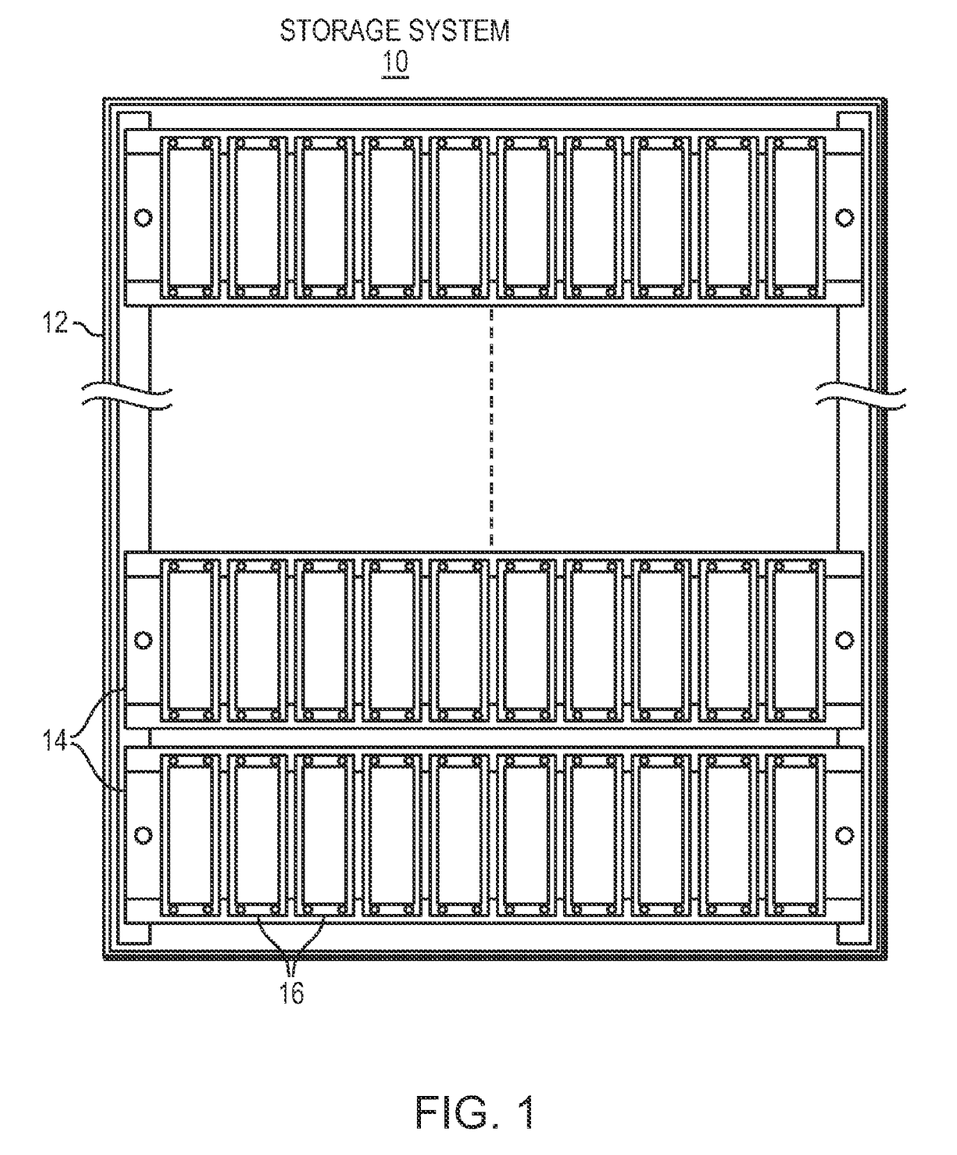
FIG. 1 is a representation of a rack mount system including several storage enclosures and is an example of an embodiment of a computer system that may utilize the techniques described herein.
Figure 2:
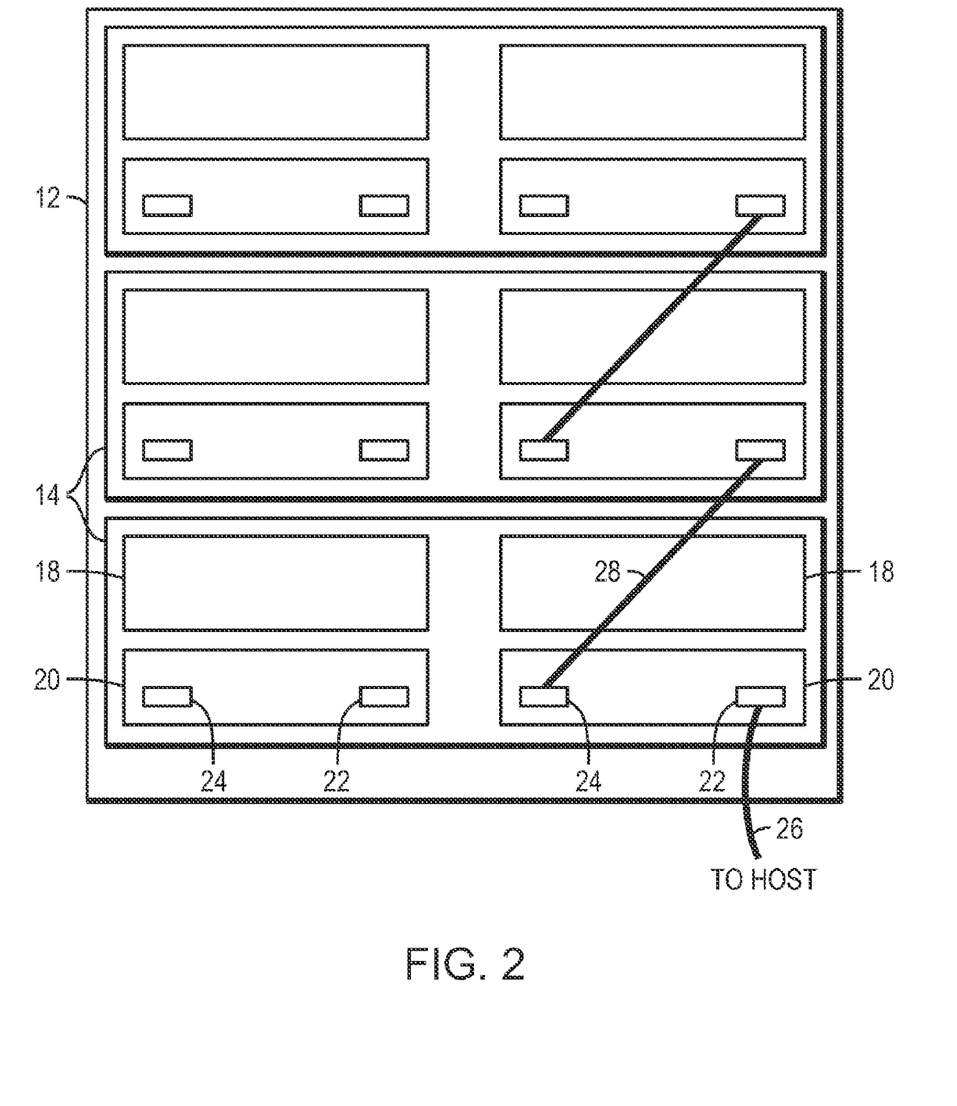
FIG. 2 is a rear view of the rack mount system and storage enclosures of FIG. 1.

Referring to FIG. 1, shown is an example of an embodiment of a data storage system 10 that may be used in connection with performing the technique or techniques described herein. A rack mount cabinet 12 includes several storage enclosures 14. Each storage enclosure 14 includes several disk drives 16. The disk drives and the enclosures are preferably interconnected via a serial bus loop or ring architecture, e.g., Fibre Channel Arbitrated Loop (FC-AL). In FIG. 2 there is shown a rear view of the rack mount cabinet 12 and the storage enclosure 14. Each storage enclosure includes two power supplies 18, and two LCCs 20. The power supplies 18 and link control cards 20 are coupled to the disk drives 16 via a midplane within the chassis (not shown in FIG. 2). The link control card 20 serves to interconnect the disks and enclosures on the communication loop FC-AL.

Each link control card 20 includes a primary port 22 and an expansion port 24. These ports are used to link the storage enclosures together on a single communication loop FC-AL. A cable 26 may come from a host or from another storage system, and plugs into the primary port 22. The communication loop FC-AL extends from the primary port 22, is coupled to the disk drives 16, and continues out the expansion port 24. A cable 28 couples the expansion port 24 of a first storage enclosure 14 to the primary port 22 of a second storage enclosure 14. All the storage enclosures 14 are interconnected in this manner in a daisy chain to form the communication loop FC-AL. Thus, all the disk drives 16 are interconnected on the same communication loop FC-AL. Each link control card 20 is capable of controlling all the disks 16 in a given enclosure.

Figure 3:
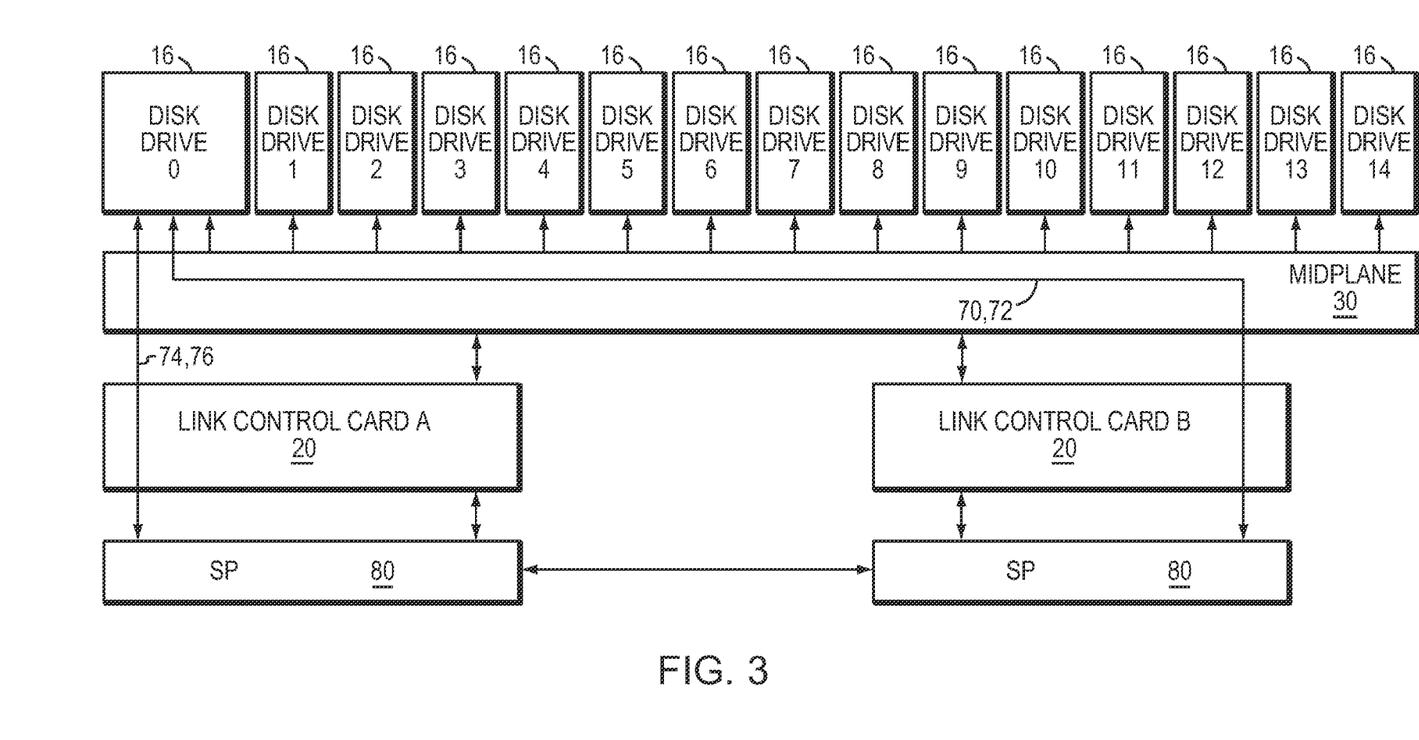
FIGS. 3-4 are block diagrams of components of the rack mount system and storage enclosures of FIG. 1 that may be used in connection with techniques herein.

FIG. 3 illustrates communication among drives 16, midplane 30, LCCA and LCCB 20, and storage processors ("SPs") 80. In at least some embodiments, storage processors 80 are controllers within the storage system that control the storage system's access to the storage enclosure, and are configured to communicate with each of drives 16 (exemplified by drive 0 in FIG. 3) over respective Fibre Channel links (loops) 74, 70, and over respective diplexing links 76, 72 as described in U.S. Pat. No. 5,901,151 to Bleiweiss, et al. entitled "System for orthogonal signal multiplexing", which is hereby incorporated herein by reference in its entirety.

Figure 4:
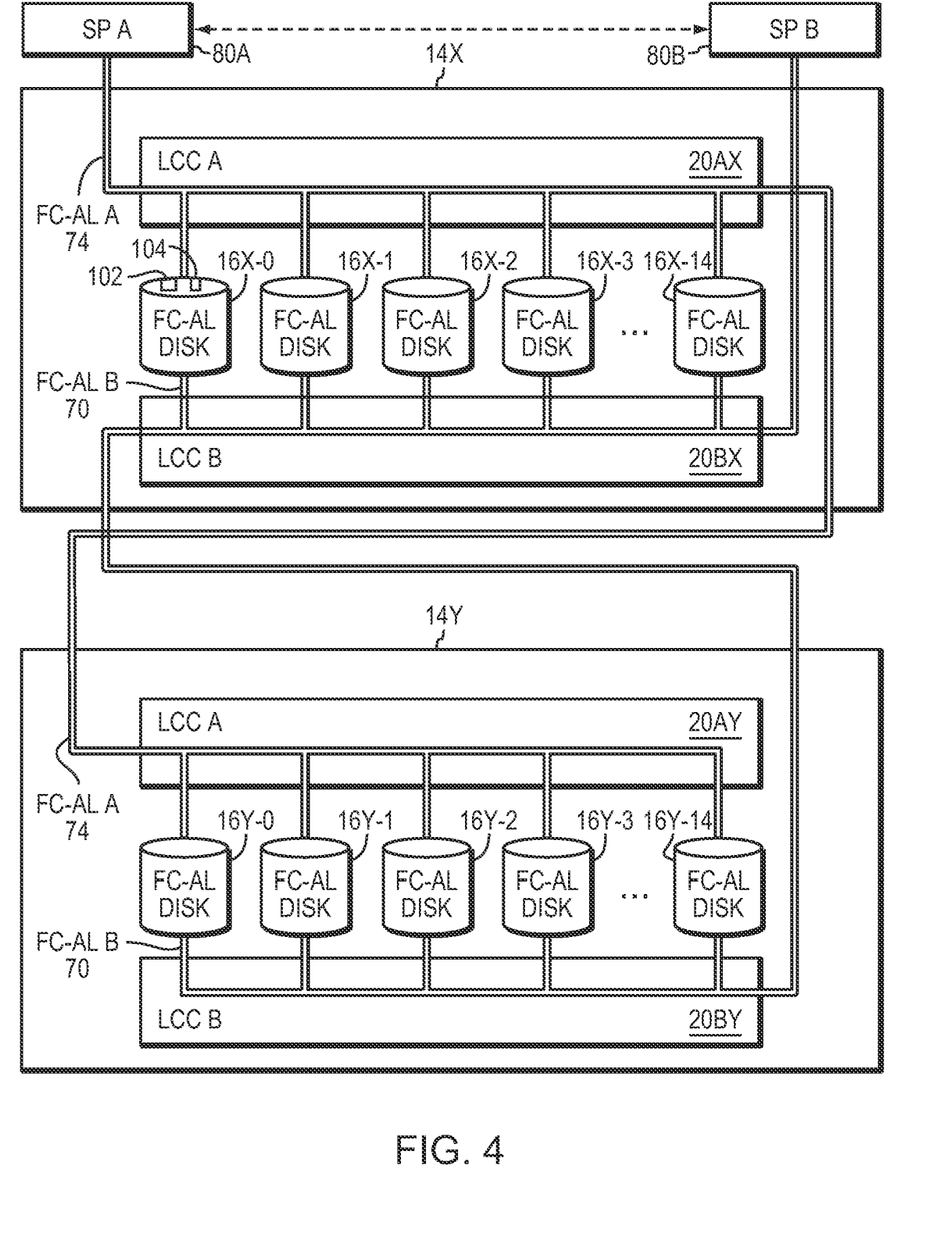

FIG. 4 illustrates an example implementation of data storage system 10 having enclosures 14 (specifically 14X, 14Y) in communication with SPs 80 (specifically 80A, 80B) using communication loops FC-AL 74, 70. (Mechanically, SPs 80A, 80B may or may not be included in one of enclosures 14X, 14Y.) Enclosure 14X has LCCs 20AX, 20BX and disks 16X-0 through 16X-14, and enclosure 14Y has LCCs 20AY, 20BY and disks 16Y-0 through 16Y-14. Loop 74 allows SP 80A to communicate with disks 16X-0 through 16X-14 via LCC 20AX, and with disks 16Y-0 through 16Y-14 via LCC 20AY. Loop 70 allows SP 80B to communicate with disks 16X-0 through 16X-14 via LCC 20BX, and with disks 16Y-0 through 16Y-14 via LCC 20BY.

Each of disks 16X-0 through 16X-14 and 16Y-0 through 16Y-14 has a FC receiver and a FC transmitter for each loop connection. For example, disk 16X-0 has receiver 102 and transmitter 104. Thus, a communication directed from SP 80A to disk 16Y-14 is first received at disk 16X-0 by receiver 102 and is transmitted by transmitter 104 to disk 16X-1, which in turn passes the communication along to disk 16X-2, and so on. The communication passes between enclosures when disk 16X-14 passes it to disk 16Y-0, which in turn passes it to disk 16Y-1, and so on. Ultimately the communication reaches its destination, disk 16Y-14. As shown in FIG. 4, a communication directed from disk 16Y-14 to SP 80A travels directly to SP 80A since there are no disks between disk 16Y-14 and SP 80A in that direction on the loop.

With respect to each loop, one or more disks or enclosures may be set, e.g., using the diplex signals, to a bypass mode such that FC signals travel along the loop as if the disks or enclosures were not on the loop. For example, if enclosure 14Y is set to bypass mode, a communication directed from disk 16X-14 to SP 80A travels directly to SP 80A since there are no disks between disk 16X-14 and SP 80A in that direction on the loop when enclosure 14Y is not on the loop. In another example, if disk 16X-2 is set to bypass mode, a communication directed from SP 80A to disk 16X-4 passes directly from disk 16X-1 to disk 16X-3 on its way to disk 16X-4.

Figure 5:
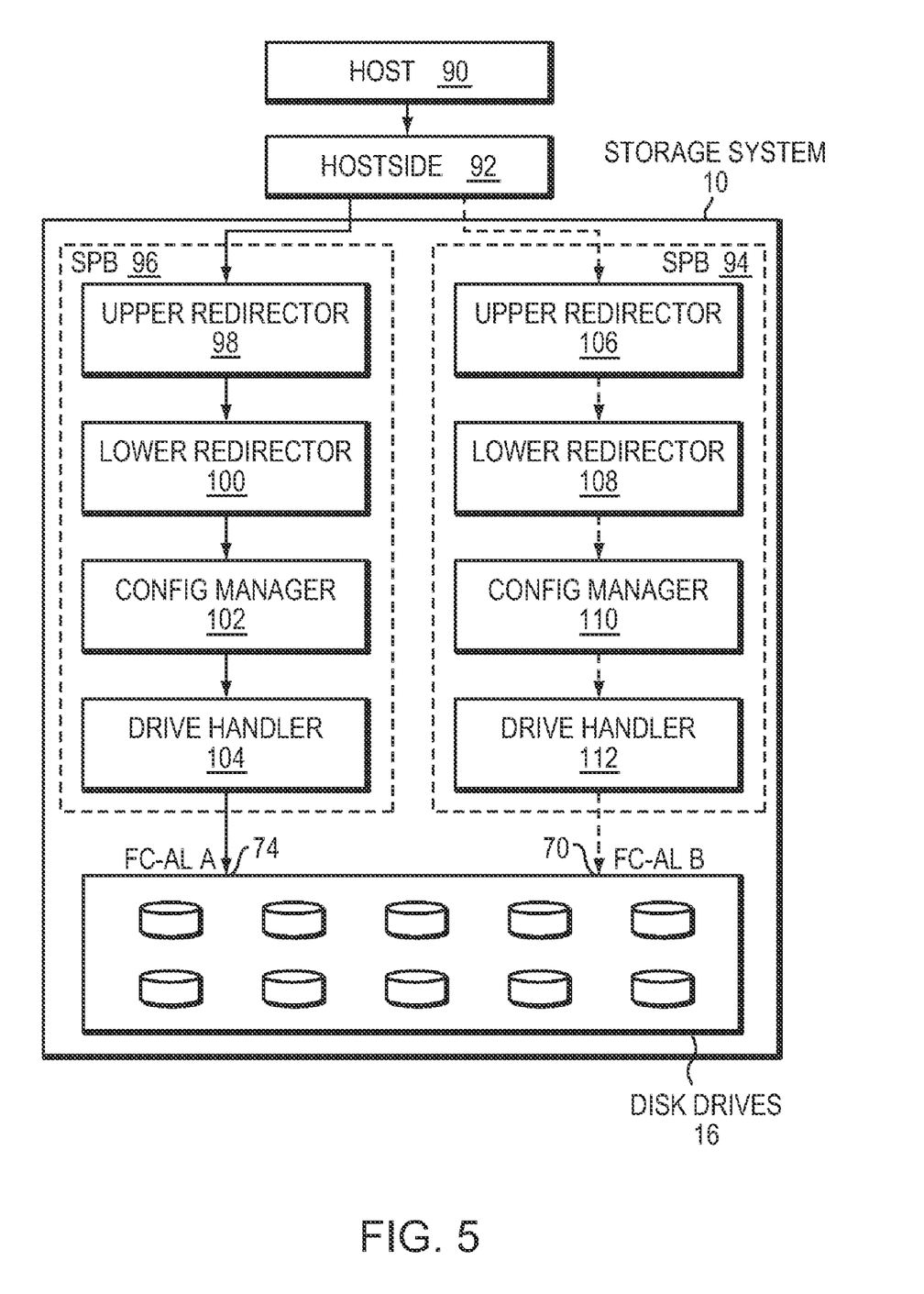
FIG. 5 is a diagram illustrating in more detail components that may be used in connection with techniques herein.

Referring to FIG. 5, shown is more detailed representation of components that may be included in an embodiment using the techniques herein. In a data storage system such as data storage system 10, a storage processor provides communications between host system 90 and disk drives 16. Data storage system 10 includes at least two storage processors 96, 94. Storage Processor (SPA) 96 accesses the disk drives 16 using Fibre Channel communication loop FC-AL 74 and storage processor (SPB) 94 accesses the disk drives 16 using Fibre Channel communication loop FC-AL 70.

Host system 90 may not address the disk drives of the storage systems directly, but rather access to data may be provided to one or more host systems from what the host systems view as a plurality of logical devices or logical volumes ("LVs" or "LUNs"). Host system 90 sends a request to hostside logic ("hostside") (e.g., hostside 92) to access data stored on logical devices. The hostside sends appropriate status back to the host system in case access to data fails. The LVs may or may not correspond to the physical disk drives. For example, one or more LVs may reside on a single physical disk drive. Data in a single data storage system may be accessed by multiple hosts allowing the hosts to share the data residing therein. Regarding terminology related to a storage system, the host or host network is sometimes referred to as the front end and from disk adapters toward the disks is sometimes referred to as the back end. A disk adapter is a component that allows disk drives to communicate with a storage processor.

Figure 6:
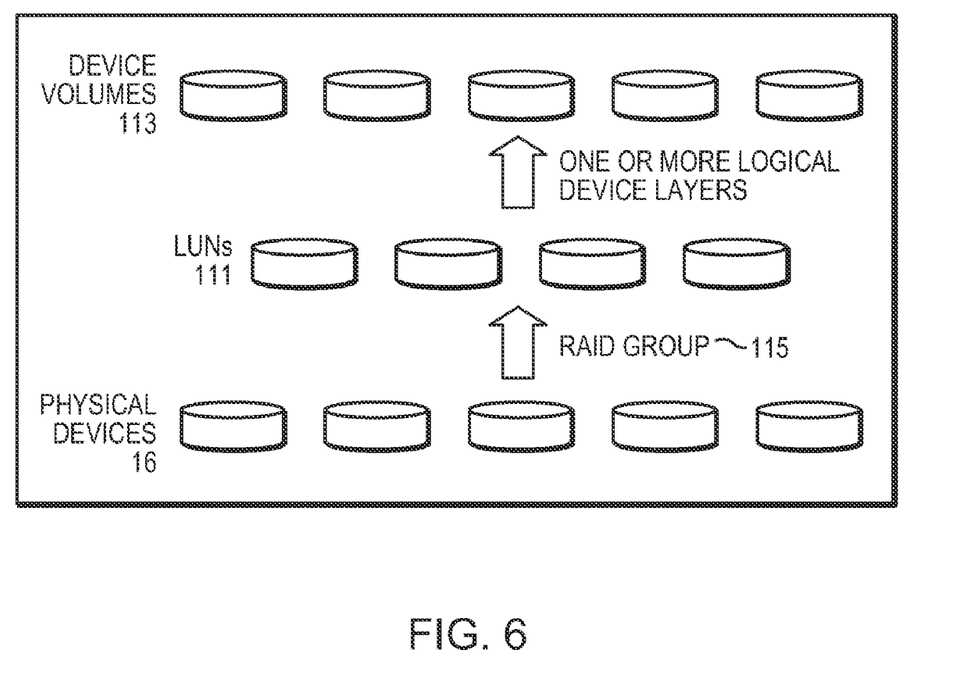
FIG. 6 is an example illustrating storage device layout.

FIG. 6 illustrates one of the many ways data can be stored on the disk drives 16. For example, RAID Group 115 may be formed from physical devices 16. The data storage system 10 best practices of a policy may specify the particular RAID level and configuration for the type of storage extent being formed. The RAID Group 115 may provide a number of data storage LUNs 111. An embodiment may also utilize one or more additional logical device layers on top of the LUNs 111 to form one or more logical device volumes 113. The particular additional logical device layers used, if any, may vary with the data storage system. It should be noted that there may not be a 1-1 correspondence between the LUNs of 111 and the volumes of 113. In a similar manner, device volumes 113 may be formed or configured from physical devices 16. Device volumes 113, LUNs 111 and physical devices 16 may be configured to store one or more blocks of data or one or more files organized as a file system.

In at least some systems, one storage processor ("primary SP") is primarily responsible for all communications with a set of disk drives in a data storage system, and one or more other SPs may be primarily responsible for all communications with other sets of disk drives in the data storage system. A back end path failure occurs when a problem in any of components that make up the back end causes a set of disk drives to be inaccessible on a primary SP in a data storage system but accessible on another SP in the data storage system. A back end path failure is generally caused by a faulty fibre channel cable, a link control card or a single disk port failure in a disk with two ports. When a back end path failure occurs for the set of disk drives in communication with the primary SP, the data storage system 10 shuts down the affected disk drives on that primary SP. On determining that the other SP can access the set of disk drives, a trespass command is issued to the other SP that transfers the responsibility of communication with the affected disk drives to the other SP, in effect causing the other SP to become the new primary SP for the affected disk drives. Thus, use of the current technique can help enable IOs to be redirected to an alternate path (e.g., the most efficient alternate path) within the data storage system. For example, host 90 sends an IO request through hostside 92 to storage processor SPA 96. Based on the IO request, SPA 96 sends corresponding data requests to disk drives 16 through upper redirector 98, lower redirector 100, configuration manager ("CM") 102 and drive handler 104. Upper redirector 98 and lower redirector 100 enable the data storage system to provide an alternate path to a set of disk drives by redirecting I/Os from one SP to another SP. Drive handler 104 enables the data storage system to interact with disk drives 16. Configuration manager 102 communicates with other storage processors in the data storage system in order to enable the data storage system to determine an alternate path to a set of disk drives. Configuration manager 102 detects a back end path failure where communication loop FC-AL A 74 cannot access LUNs on a set of disk drives in a RAID group. It should be noted that detection of the back end path failure may happen at any of different places within a storage processor. For example, configuration manager 102 may detect a back end failure when SPA 96 accesses data from a set of disk drives 16. Lower redirector 100 then may receive a status report from configuration manager 102 indicating that a LUN is missing disks due to a back end path failure. Lower redirector 100 broadcasts the status report to other storage processors in the data storage system 10, in this case to lower redirector 108 of SPB 94 (also referred as peer SP). The SPB 94 then compares the status report with SPB's own local data. If SPB 94 is in a better state and can access the LUNs associated with the set of disk drives in the RAID group, the data storage system causes SPA 96 to send a trespass command to SPB 94 that pulls ownership of the affected LUNs from SPA 96 to SPBB 94. The trespass command changes responsibility of communication with the set of disk drive in RAID group from SPA 96 to SPB 94, in effect, by changing the ownership of one or more LUNs associated with the set of disk drives. When ownership of the LUNs are transferred to SPB 94, IOs from host 90 are redirected to SPB 94. Storage Processor SPB 94 then services those IOs by sending the IO requests to disk drives 16 through upper redirector 106, lower redirector 108, configuration manager 110, drive handler 112 and communication loop FC-AL B 70. Lower redirectors 100 and 108 may also handle rejected read/write IOs that were rejected because a set of disk drives are inaccessible due to a back end path failure on SPA 96 or SPB 94. In that case, IOs targeted for the set of disk drives may also be redirected to the peer SP (e.g., I/Os from SPA 96 may be redirected to SPB 94 in case of failure on SPA 96 and I/Os from SPB 94 may be redirected to SPA 96 in case of failure on SPB 94) and those redirected I/Os could also fail due to any number of reasons on the peer SP. In that case, lower redirectors 100 and 108 retries the failed IOs on their respective local SPs again.

During processing of back end path failures, there may be large IOs outstanding that may bypass a storage processor cache while configuration manager 102 is shutting down the affected LUNs associated with the set of disk drives that are inaccessible due to back end path failures. These outstanding IOs may cause potential data lost or data corruption issues because a data communication protocol such as SCSI protocol does not guarantee that host will try the same IO again from a peer SP. Therefore, when these IOs that bypassed the storage processor cache ("write-a-side" IOs) are outstanding, configuration manager 102 keeps the ownership of affected LUNs associated with the set of disk drives with SPA 96 and does not trigger processing of back end path failure by determining an alternate path. Configuration manager 102 sends a request to disk drive 16 that determines whether there are any write-a-side IOs pending. Configuration manager 102 then decides whether to transfer the ownership of the affected LUNs to another SP that has a better path to the disk drives 16. Once back end problems are fixed and SPA 96 regains access to the disk drives through communication loop FC-AL A 74, ownership of all the affected LUNs returns to SPA 96, in turns, avoiding the need to rebuild the set of disk drives.

Figure 7:
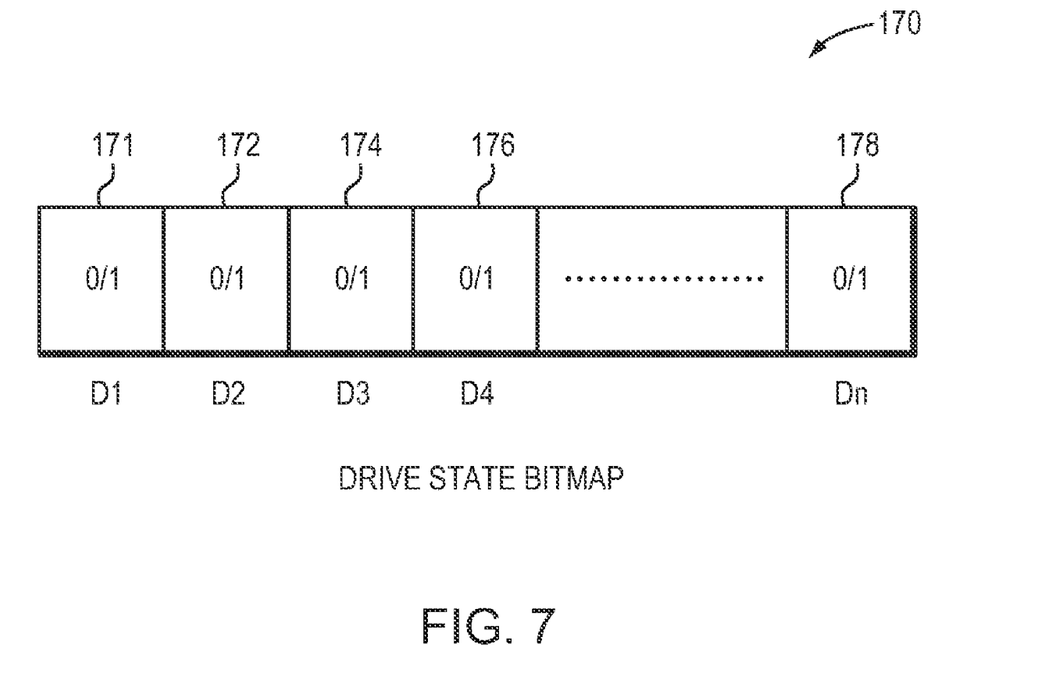
FIG. 7 is a diagram illustrating a drive state bitmap.

Referring to FIG. 7, shown is a block diagram of a drive state bitmap that is used in at least some embodiments in determining an alternate path in a data storage system in accordance with the current technique. Drive state bitmap 170 stores the status of a set of disk drives in a RAID group. Each storage processor maintains a bitmap indicating their local status of disk drive access. For example, for a set of disk drives D1-Dn in a RAID group, D1 171 indicates whether access to disk D1 is operational and working, D2 172 indicates status for drive D2, D3 174 indicates status for drive D3, D4 176 indicates status for drive D4 and Dn 178 indicates status for drive Dn.

Figure 8:
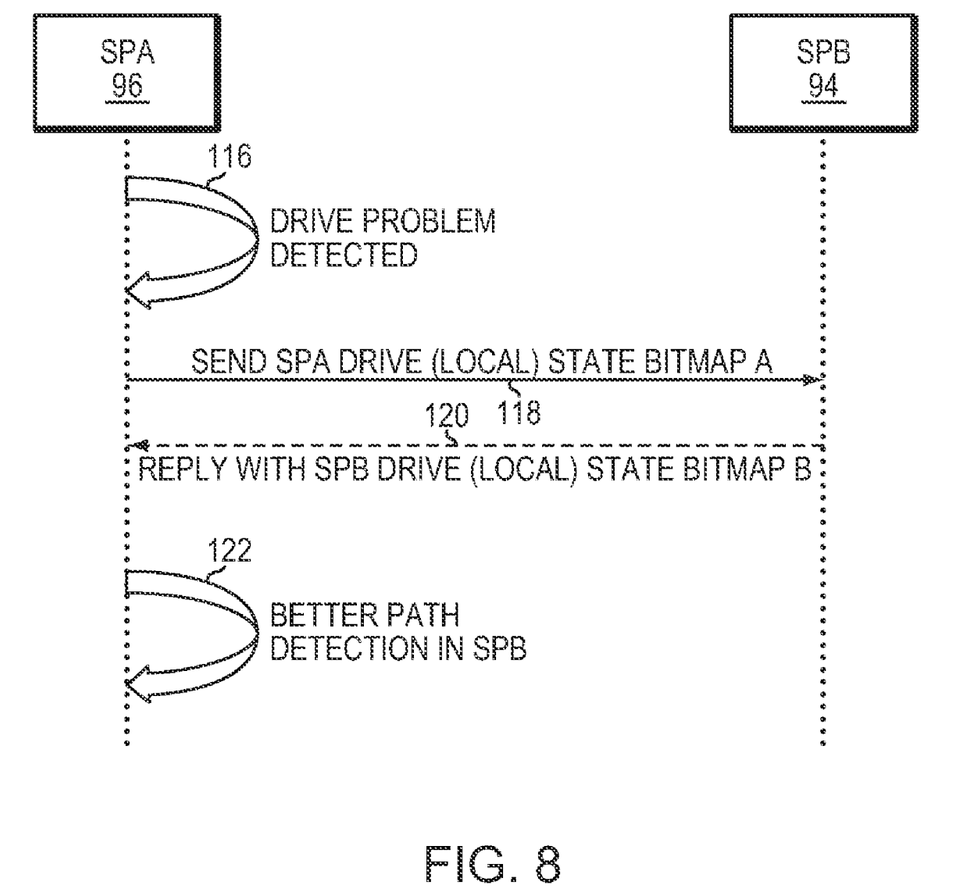
FIG. 8 is a diagram illustrating sequence of events that may be used in connection with techniques herein.

Referring to FIG. 8, shown is a diagram illustrating a method of back end path failure handling by determining an alternate path in case of a disk drive access failure on a single storage processor. First, local SP (SPA 96, for example) detects a drive problem when the local SP cannot access a drive due to one or more back end problems (step 116). SPA 96 sends a message to peer SP (SPB 94, for example) along with its own local drive state bitmap A (step 118). Once the peer SP (SPB 94) receives the message, the peer SP replies back with the peer SP's own drive state bitmap B, and saves the bitmap A received from SPA (step 120). Once SPA 96 receives the reply from SPB 94, it uses the local drive state bitmap A and peer drive state bitmap B, to determine whether a peer SP has better path to the drive on which SPA detected a back end problem (step 122).

A local drive of a storage processor is a drive that primarily communicates with that storage processor and the storage processor has ownership of one or more LUNs associated with that local drive. Also, each storage processor in the data storage system maintains a local drive state bitmap that includes information regarding a set of disk drives with which each storage processor primarily communicates. There may be different failure scenarios where back end path failure handling determines the alternate path in a faulted system. Some of the failure scenarios are illustrated below. First is a single drive failure on both storage processors. In this case, SPB also sends the same request to SPA requesting information on disk drive status for all the disks within a RAID group. Because configuration manager runs independently on each SP, there may be some timing differences as to when the SPs are able to detect a local drive problem. Both SPs in this case get the local drive state bitmap of the other SP and start drive rebuild processing. Eventually LUNs associated with the disk drive will become degraded. A LUN goes into a degraded mode when I/Os directed to that LUN start failing. Lower redirector will then be notified that the LU is degraded and missing disks. Second case is when a local SP looses access to one drive and a peer SP looses access to another drive. When the local SP detects problem accessing a drive, it sends a status to its lower redirector indicating that a set of LUNs on that disk drive are in inaccessible state and the SP can not service IO without going into degraded mode. The lower redirector of the local SP gets the status and broadcasts it to the peer SP. The peer SP determines that it has a better path and pulls the ownership of the set of LUN on the disk drive over to itself by causing a trespass command to be executed. Later the peer SP detects a problem accessing another drive. Because the peer SP is already aware of disk access problem on the local SP, it kicks off drive rebuild processing for the drive. If the same drive fails on both SPs, then the data storage system will go into degraded operations for the affected volumes (LUNs) with ownership on the last SP for which explicit ownership was established. If access to different drives fail on both SPs, then the SP for which explicit ownership was last established will assume ownership of the given volume(s) with degraded operations.

Figure 9:
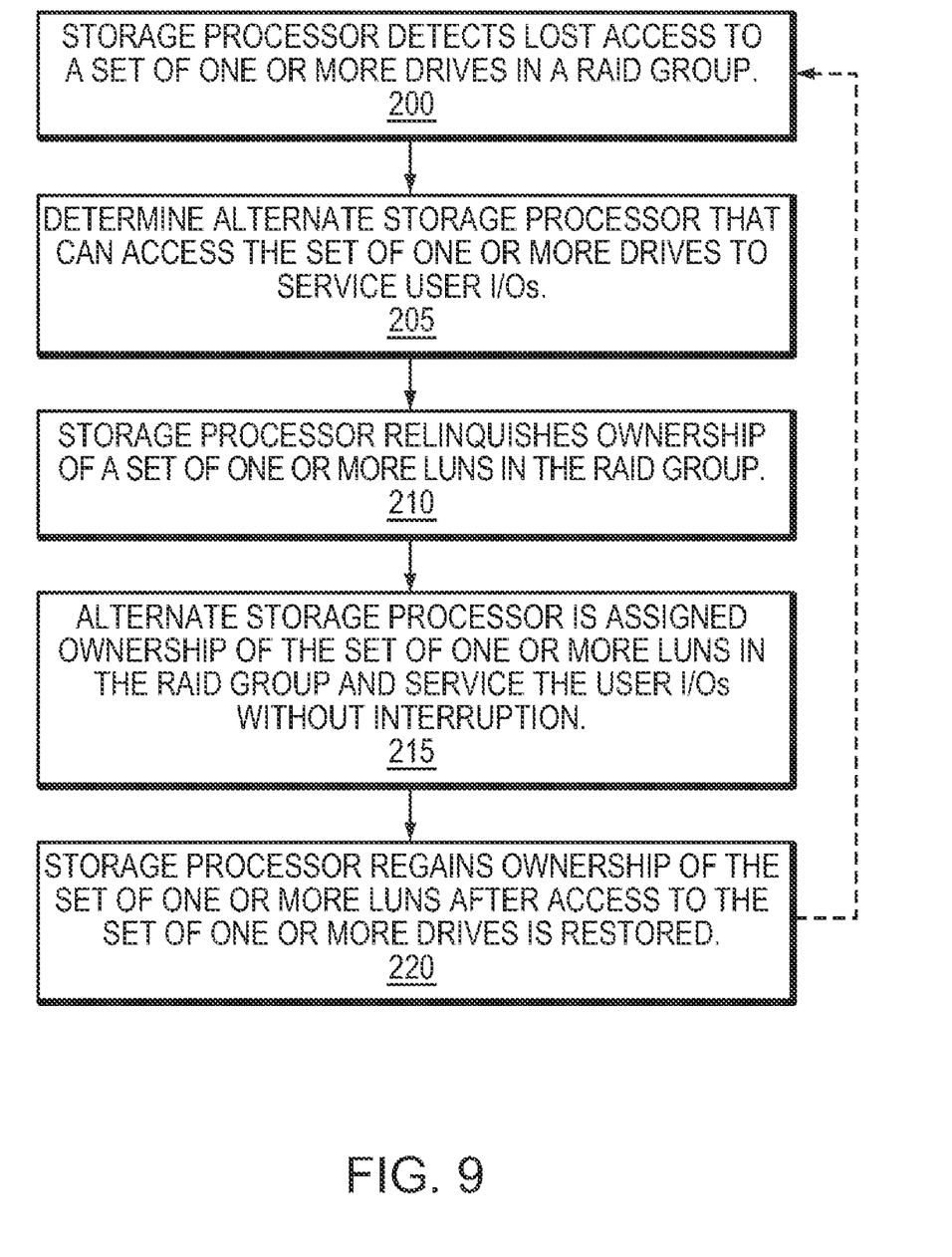
FIGS. 9-10 are flow diagrams illustrating processes that may be used in connection with techniques herein.

Referring to FIG. 9, shown is a flow diagram illustrating the method of determining alternate paths in faulted systems. With reference also to FIGS. 5 and 6, determining alternate paths starts with a storage processor in a data storage system 10 detecting lost access to a set of one or more disk drives in a RAID group (step 200). The storage processor then proceeds to determine an alternate path in order to continue servicing user I/Os from a host system 90 by finding a better path to access the set of one or more disk drives (step 205). Upon finding the better path, the storage processor relinquishes ownership of a set of one or more LUNs associated with the set of disk drives in the RAID group (step 210). An alternate storage processor having the better path is assigned ownership of the set of one or more LUNs and I/Os from the host system 90 are redirected to that storage processor (step 215). Once access to the set of one or more disk drives is restored, the original storage processor regains ownership of the set of one or more LUNs from the alternate storage processor (step 220).

Figure 10:
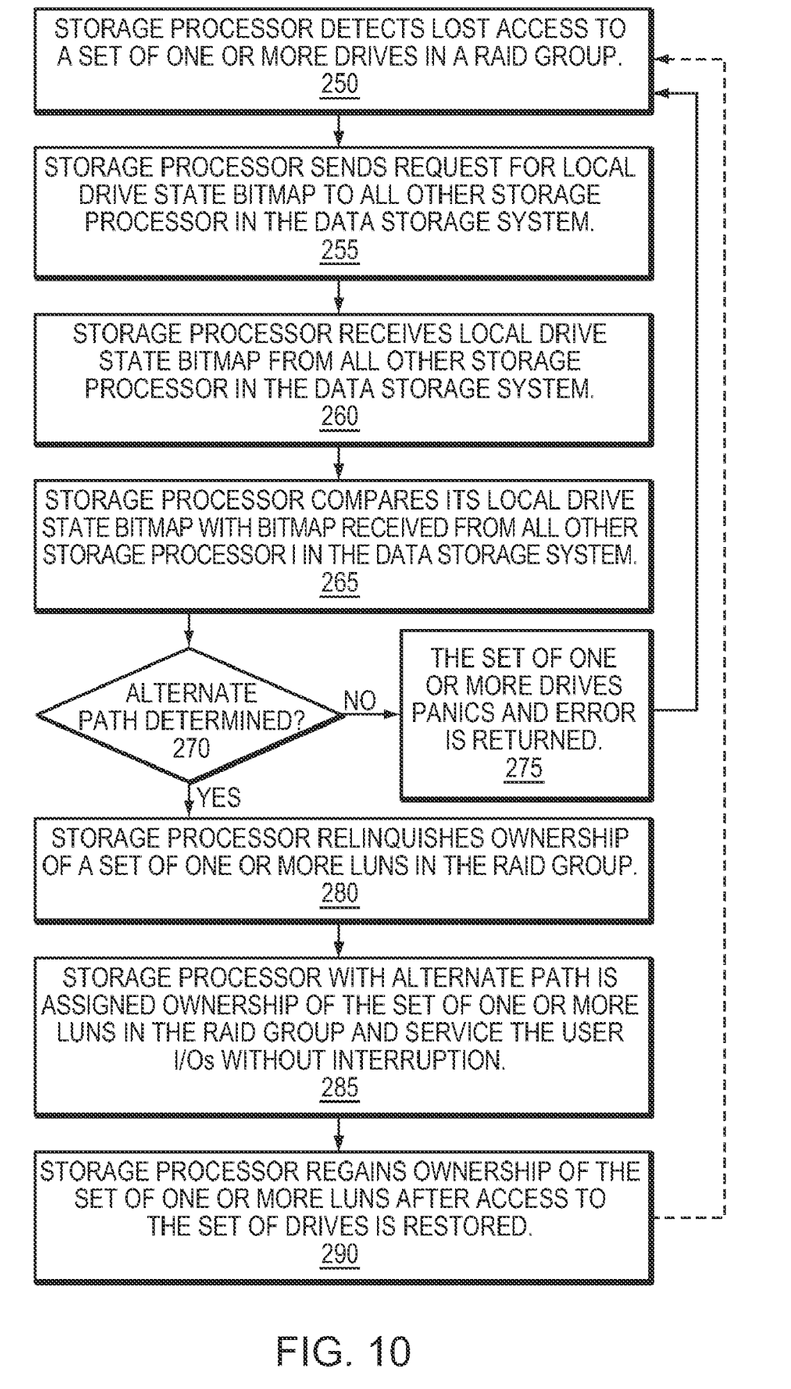

Referring to FIG. 10, shown is a flow diagram illustrating in detail the method of determining an alternate path on detecting a back end problem in a data storage system. With reference also to FIGS. 5, 6 and 7, when a storage processor detects a back end failure while accessing a set of one or more disk drives in a RAID group (step 250), the storage processor sends requests to all other storage processors in a data storage system 10 for information on their respective local drive state bitmap 170 (step 255). Upon receiving the information from all the other storage processors (step 260), the storage processor compares its local drive state bitmap with information received from other storage processors in order to determine, if possible, an alternate path to the set of disk drives in the RAID group (step 265). If no alternate path is determined (step 270), an error is returned back to a host system 90 and system continues servicing IO in degraded mode (step 275). Upon finding an alternate path, the storage processor relinquishes ownership of a set of one or more LUNs associated with the set of disk drives in the RAID group (step 280). An alternate storage processor having the alternate path is assigned ownership of the set of one or more LUNs and I/Os from the host system 90 are redirected to that storage processor (step 285). Once access to the set of one or more disk drives is restored, the original storage processor regains ownership of the set of one or more LUNS from the alternate storage processor (step 290). Additionally, when a request is received from a peer SP to handle a back end failure, a few sanity checks are performed to ensure that an alternate path can be determined. Some of the sanity checks are as follows: determination of whether a write cache is enabled, determination of whether a write cache of a peer SP is enabled and determination of whether a write cache of a disk drive is enabled.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in determining alternate paths in faulted systems, the method comprising:
    detecting that a first processor has a problem accessing a target, wherein the first processor has a first path to the target;
    receiving respective information about communication with the target from each processor of a set of processors, wherein each processor from the set of processors has a respective path to the target, wherein the information includes status of the target;
    comparing the respective information received from each processor of the set of processors with information of the first processor having the problem accessing the target;
    based on the comparison, determining an alternate path to the target by identifying that a second processor has better access to the target than the first processor, wherein the second processor has a second path to the target, wherein the set of processors include the first and second processors; and
    transferring responsibility for I/O communication with the target, from the first processor to the second processor.

2. The method of claim 1, wherein determining alternate paths in faulted systems further comprising:
    transferring responsibility for I/O communication with the target, back to the first processor upon resolution of the problem.

3. The method of claim 1, wherein the path comprises a Fibre Channel Arbitrated Loop.

4. The method of claim 1, wherein the path comprises a switch.

5. The method of claim 1, wherein the target comprises disk drives in a RAID group.

6. The method of claim 1, wherein the target comprises a set of LUNs on disk drives in a RAID group.

7. The method of claim 1, wherein the alternate path to a target is a best path to the target.

8. The method of claim 1, wherein the information comprises a drive state bitmap, wherein the drive state bitmap includes status of one or more disk drives.

9. The method of claim 1, wherein transferring responsibility for I/O communication with a target further comprising:
    changing ownership of the target from the first processor to the second processor.

10. The method of claim 1, further comprising:
    requesting a drive state bitmap from each processor of the set of processors;
    comparing the drive state bitmap received from each processor of the set of processors with a drive state bitmap of a processor having a problem accessing a target; and
    based on the comparison, determining an alternate path to the target.

11. A system for use in determining alternate paths in faulted systems, the system comprising:
    a processor comprising a program logic in communication with a storage server for carrying out the steps of:
    first logic detecting that a first processor has a problem accessing a target, wherein the first processor has a first path to the target;
    second logic receiving respective information about communication with the target from each processor of a set of processors, wherein each processor from the set of processors has a respective path to the target, wherein the information includes status of the target;
    third logic comparing the respective information received from each processor of the set of processors with information of the first processor having the problem accessing the target;
    fourth logic determining, based on the comparison, an alternate path to the target by identifying that a second processor has better access to the target than the first processor, wherein the second processor has a second path to the target, wherein the set of processors include the first and second processors; and
    fifth logic transferring responsibility for I/O communication with the target, from the first processor to the second processor.

12. The system of claim 11, wherein determining alternate paths in faulted systems further comprising:
    sixth logic transferring responsibility for I/O communication with the target, back to the first processor upon resolution of the problem.

13. The system of claim 11, wherein the path comprises a Fibre Channel Arbitrated Loop.

14. The system of claim 11, wherein the path comprises a switch.

15. The system of claim 11, wherein the target comprises disk drives in a RAID group.

16. The system of claim 11, wherein the target comprises a set of LUNs on disk drives in a RAID group.

17. The system of claim 11, wherein the alternate path is a best path to the target.

18. The system of claim 11, wherein the information comprises a drive state bitmap, wherein the drive state bitmap includes information indicating state of one or more disk drives accessible to a processor.

* * * * *